(12) United States Patent
Luo et al.

(10) Patent No.: US 10,425,810 B2
(45) Date of Patent: Sep. 24, 2019

(54) METHOD FOR PHYSICAL LAYER SECURITY PROTECTION USING PUBLIC KEYS

(71) Applicant: Intel Corporation, Santa Clara, CA (US)

(72) Inventors: Pei Luo, Cupertino, CA (US); Ching-Yu Liao, Hillsboro, OR (US); Lu Lu, Hillsboro, OR (US); Kathiravetpillai Sivanesan, Portland, OR (US); Joonbeom Kim, Carrollton, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/245,009

(22) Filed: Jan. 10, 2019

(65) Prior Publication Data

US 2019/0149986 A1 May 16, 2019

Related U.S. Application Data

(60) Provisional application No. 62/619,343, filed on Jan. 19, 2018, provisional application No. 62/615,890, filed on Jan. 10, 2018.

(51) Int. Cl.
| | |
|---|---|
| *H04W 12/00* | (2009.01) |
| *H04W 12/04* | (2009.01) |
| *H04W 72/04* | (2009.01) |
| *H04L 1/00* | (2006.01) |
| *H04W 8/22* | (2009.01) |
| *H04L 9/08* | (2006.01) |
| *H04W 76/27* | (2018.01) |

(52) U.S. Cl.
CPC ....... *H04W 12/0401* (2019.01); *H04L 1/0009* (2013.01); *H04L 1/0026* (2013.01); *H04L 9/0869* (2013.01); *H04W 8/22* (2013.01); *H04W 12/001* (2019.01); *H04W 72/042* (2013.01); *H04W 76/27* (2018.02)

(58) Field of Classification Search
CPC .......... H04W 12/0401; H04W 12/001; H04W 76/27; H04W 8/22; H04W 72/042; H04L 1/0009; H04L 1/0026; H04L 9/0869
See application file for complete search history.

(56) References Cited

U.S. PATENT DOCUMENTS

| 2017/0161991 A1* | 6/2017 | Ayati | G07F 17/3244 |
| 2019/0052463 A1* | 2/2019 | O'Hare | H04L 9/0822 |

* cited by examiner

*Primary Examiner* — Khai M Nguyen
(74) *Attorney, Agent, or Firm* — Schwegman Lundberg & Woessner, P.A.

(57) ABSTRACT

Embodiments of a User Equipment (UE), Next Generation Node-B (gNB) and methods of communication are generally described herein. The UE may randomly select a private key of the UE. The UE may receive, from the gNB, control signaling that includes a public key of the gNB. The UE may generate a shuffling key based at least partly on a public function of the private key of the UE and the public key of the gNB. The UE may determine a random sequence of bits based on a random number generation operation with the shuffling key as a seed. The UE may determine, based on the random sequence of bits, a shuffling array for shuffling of coded bits. The UE may generate the coded bits, and may shuffle the coded bits in accordance with the shuffling array.

22 Claims, 10 Drawing Sheets

800

850

900

1000

METHOD FOR PHYSICAL LAYER SECURITY PROTECTION USING PUBLIC KEYS

PRIORITY CLAIM

This application claims the benefit of priority under 35 U.S.C. 119(e) to U.S. Provisional Patent Application Ser. No. 62/615,890, filed Jan. 10, 2018, [reference number AA6903-Z], and to U.S. Provisional Patent Application Ser. No. 62/619,343, filed Jan. 19, 2018, [reference number AA8090-Z], both of which are incorporated herein by reference in their entirety.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to security, including physical layer security. Some embodiments relate to public keys.

BACKGROUND

Base stations and mobile devices operating in a cellular network may exchange data. As demand for mobile services and high data rates increases, various challenges related to reliability and capacity may arise. In an example scenario, a large number of users may demand access to the network. In another example scenario, performance requirements may be more demanding for new systems and/or new applications in comparison to legacy systems and/or legacy applications. Various techniques used in these and other scenarios, including establishment of secure communication the base stations and mobile devices, may be challenging. Accordingly, there is a general need for such techniques in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
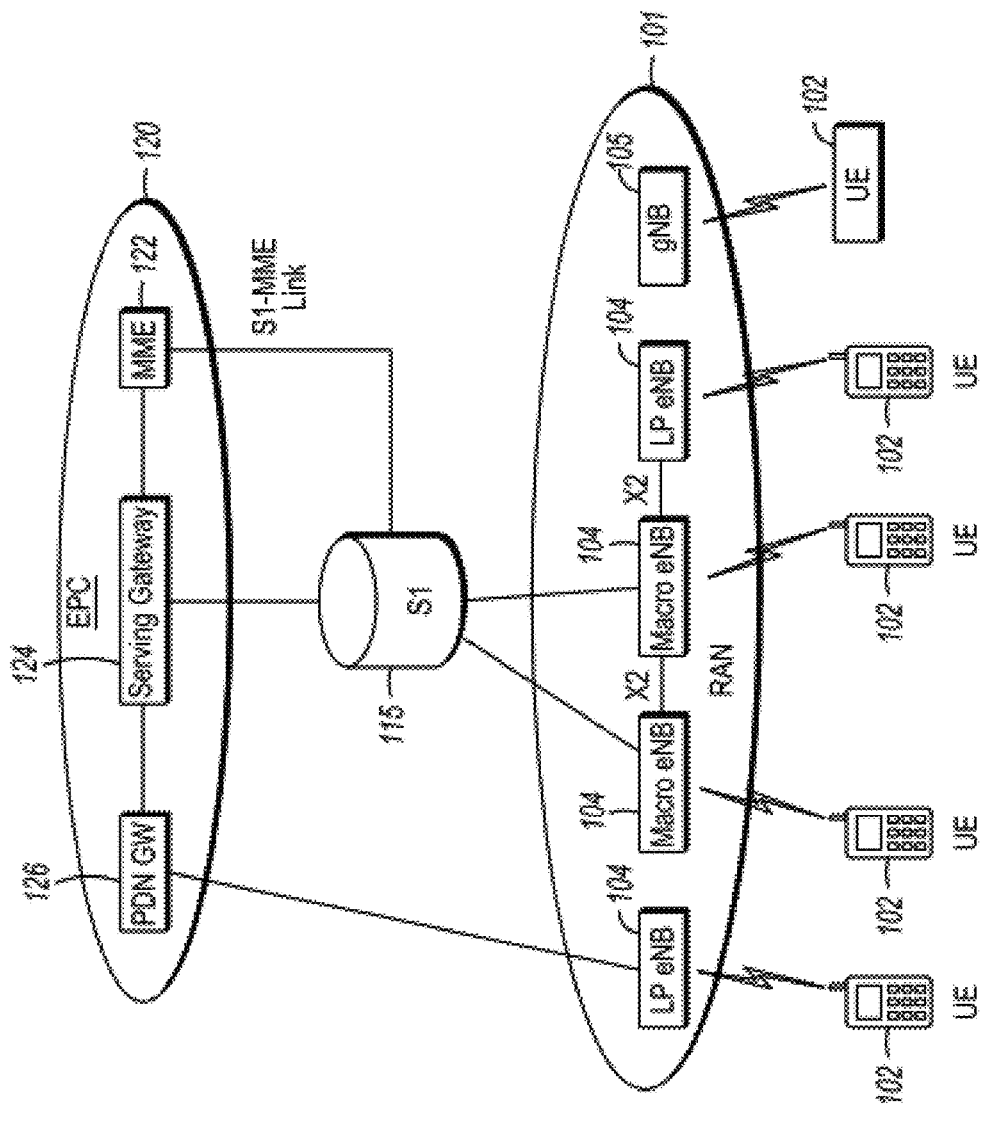
FIG. 1A is a functional diagram of an example network in accordance with some embodiments.
Figure 1B:
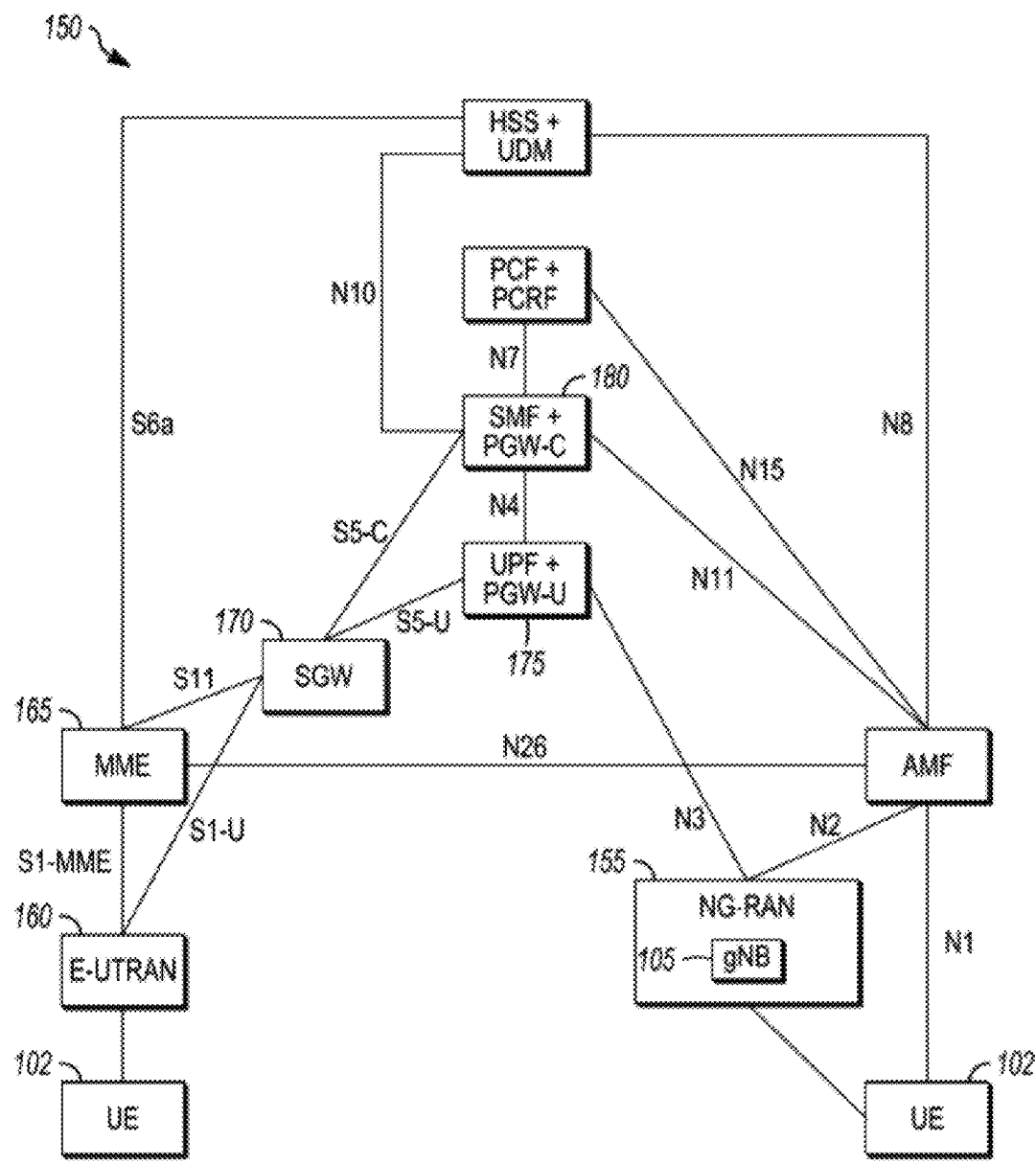
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an Si interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the 51 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
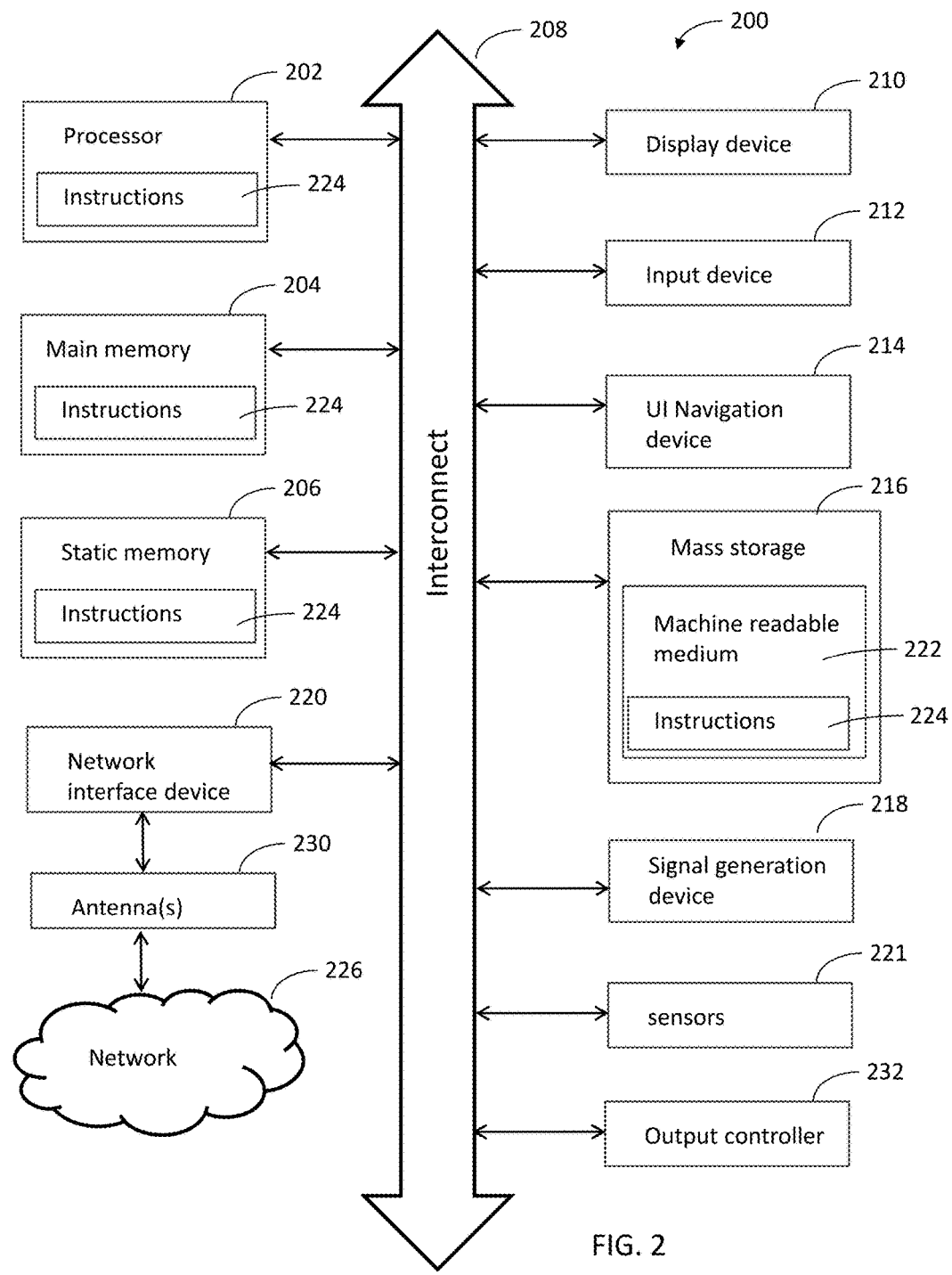
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
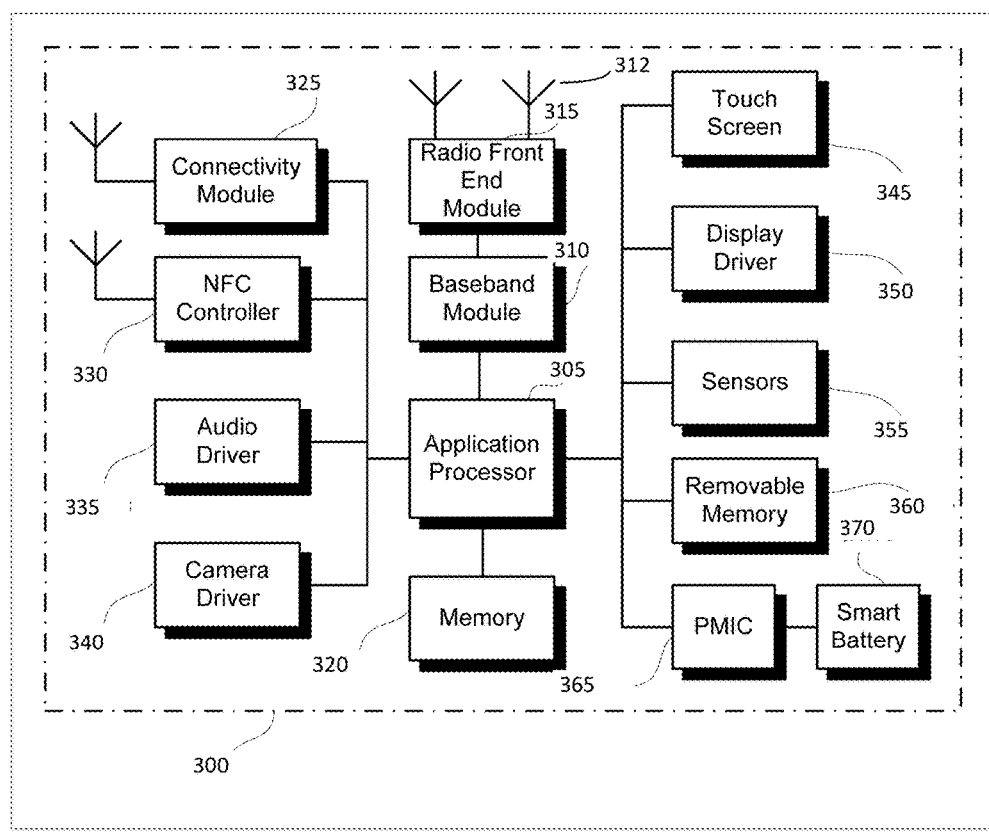
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (10), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
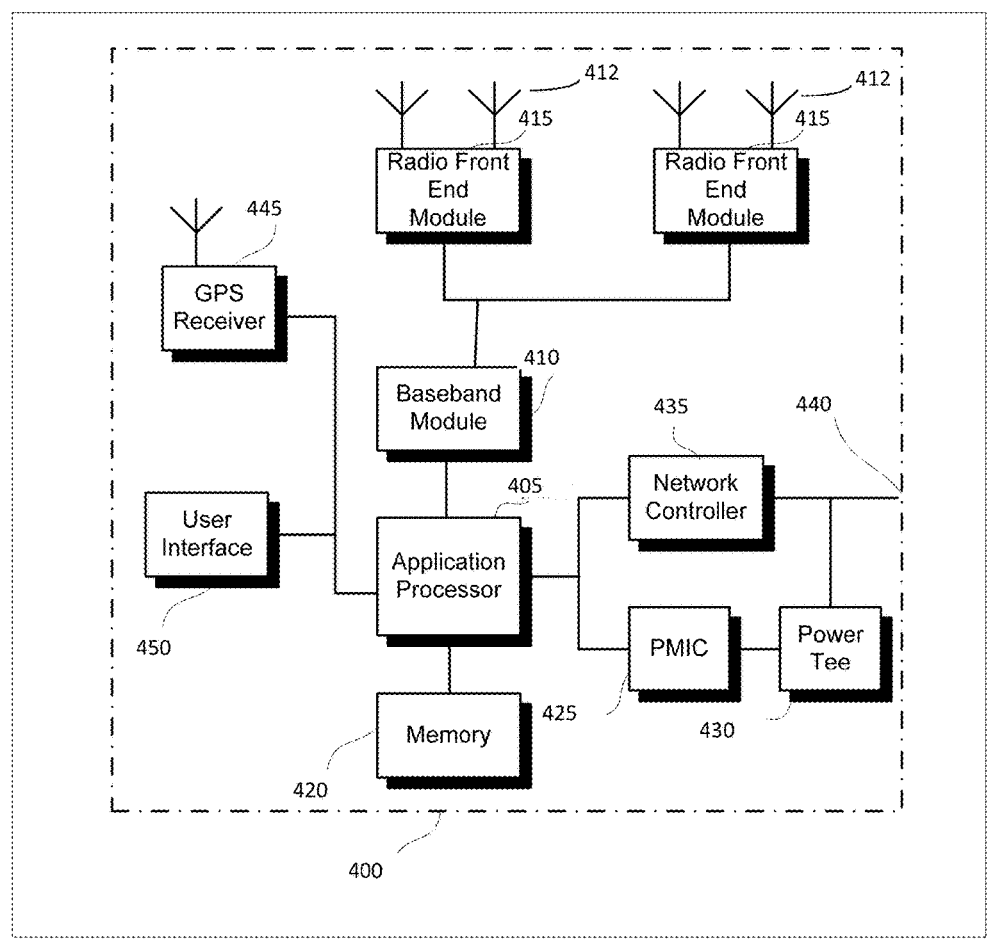
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
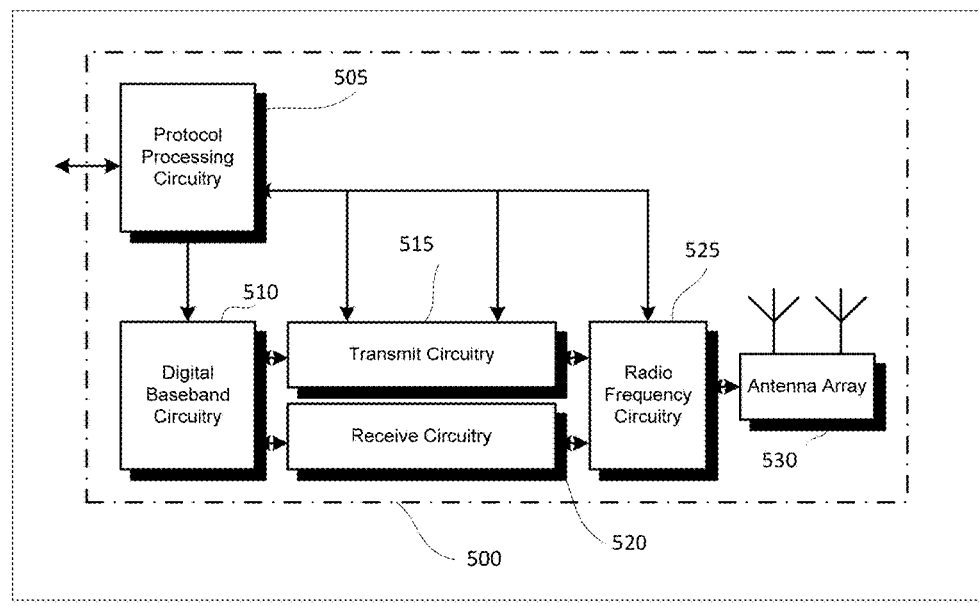
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

In accordance with some embodiments, the UE 102 may receive, from the gNB 105, a radio resource control (RRC) message that includes a UE capability enquiry element that indicates an enquiry of whether the UE 102 supports shuffling of coded bits. The UE 102 may transmit, to the gNB 105, an RRC message that includes a UE capability information element that indicates whether the UE 102 supports the shuffling. The UE 102 may randomly select a private key of the UE 102. The UE 102 may receive, from the gNB 105, control signaling that includes a public key of the gNB 105. The UE 102 may generate a shuffling key based at least partly on a public function of the private key of the UE 102 and the public key of the gNB 105. The UE 102 may determine a random sequence of bits based on a random number generation operation with the shuffling key as a seed. The UE 102 may determine, based on the random sequence of bits, a shuffling array for the shuffling of the coded bits. These embodiments are described in more detail below.

Figure 6:
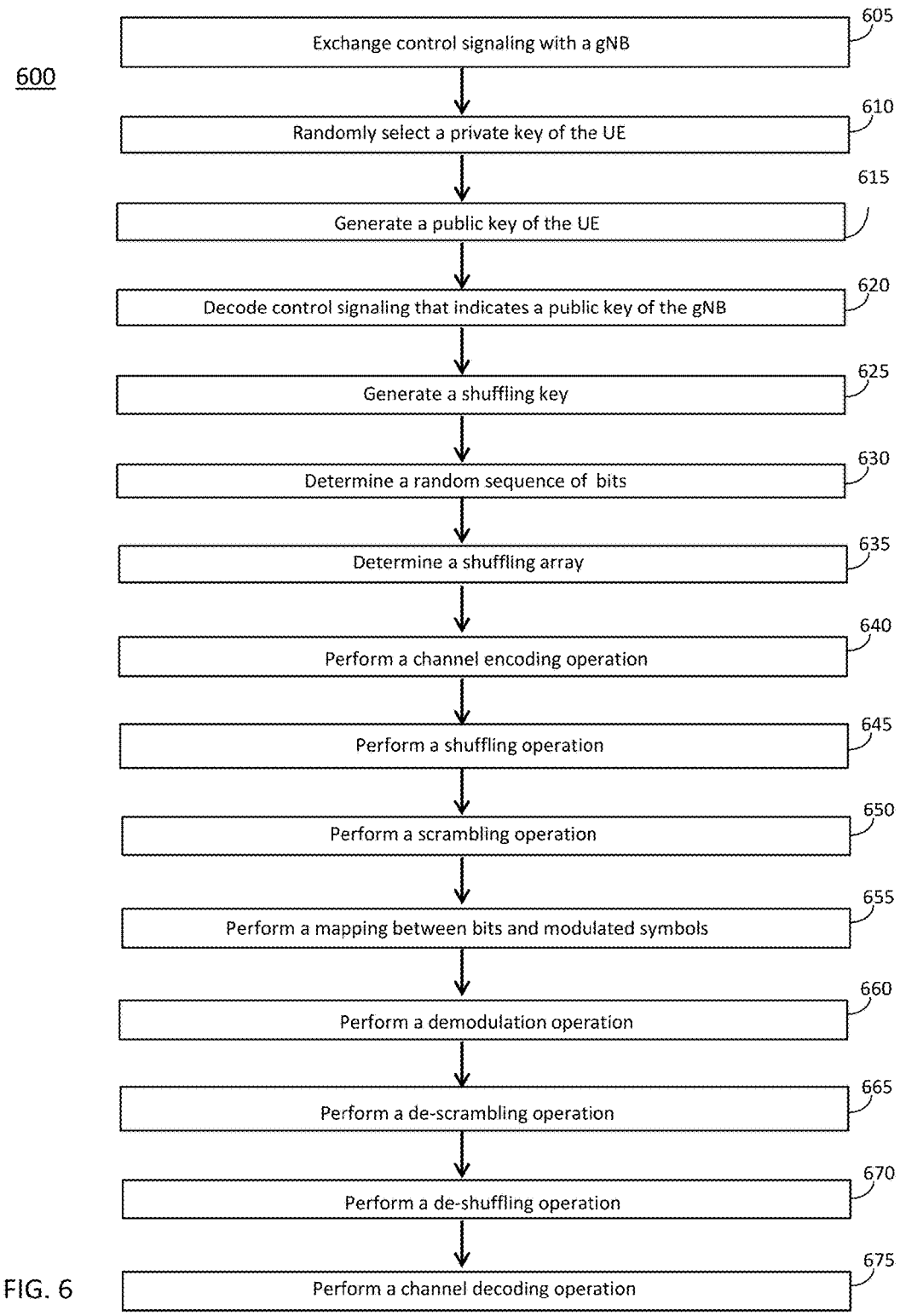
FIG. 6 illustrates the operation of a method of communication in accordance with some embodiments.
Figure 7:
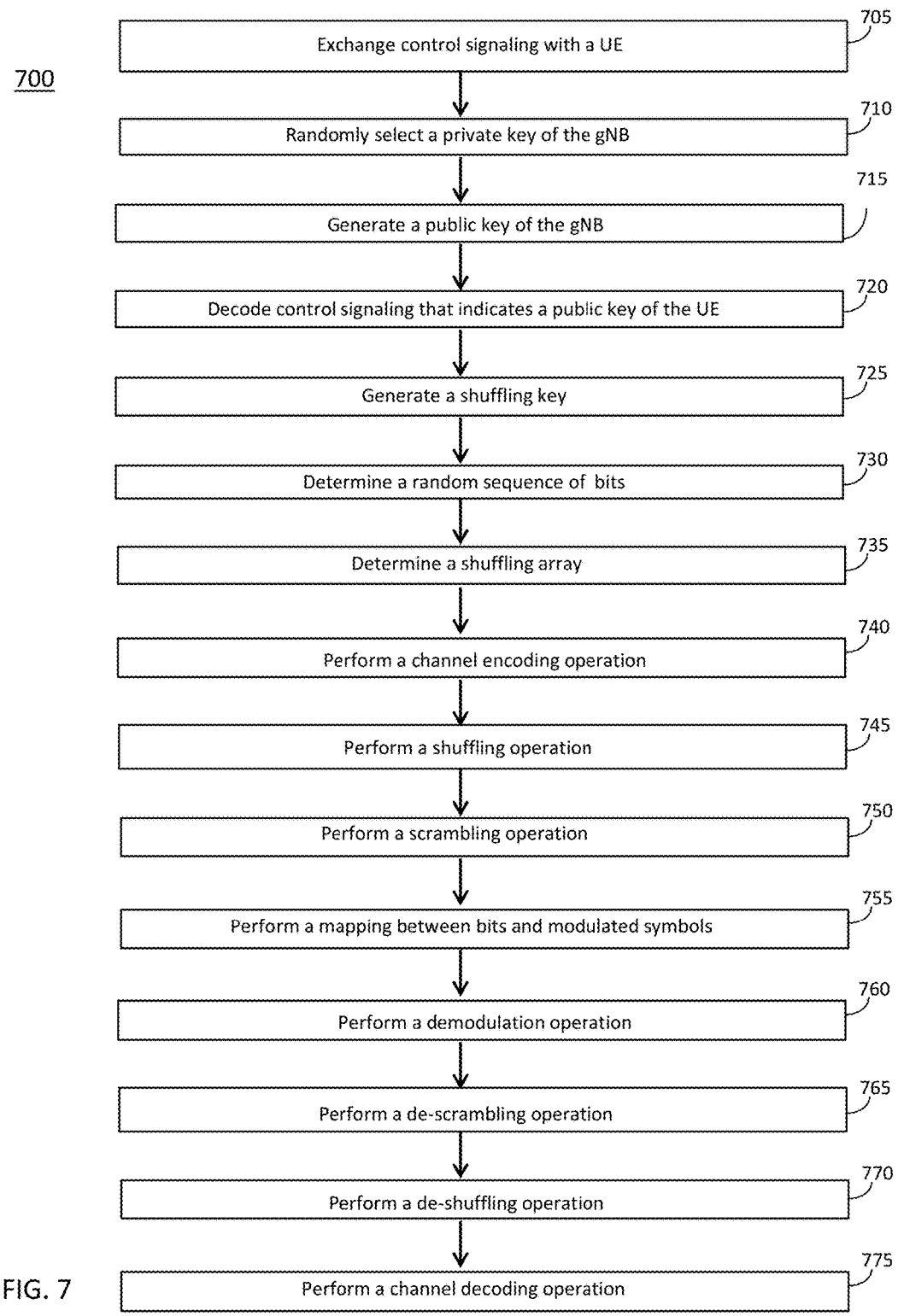
FIG. 7 illustrates the operation of another method of communication in accordance with some embodiments.

FIG. 6 illustrates the operation of a method of communication in accordance with some embodiments. FIG. 7 illustrates the operation of another method of communication in accordance with some embodiments. It is important to note that embodiments of the methods 600, 700 may include additional or even fewer operations or processes in comparison to what is illustrated in FIGS. 6-7. In addition, embodiments of the methods 600, 700 are not necessarily limited to the chronological order that is shown in FIGS. 6-7. In describing the methods 600, 700, reference may be made to one or more figures, although it is understood that the methods 600, 700 may be practiced with any other suitable systems, interfaces and components.

In some embodiments, a UE 102 may perform one or more operations of the method 600, but embodiments are not limited to performance of the method 600 and/or operations of it by the UE 102. In some embodiments, another device and/or component may perform one or more operations of the method 600. In some embodiments, another device and/or component may perform one or more operations that may be similar to one or more operations of the method 600. In some embodiments, another device and/or component may perform one or more operations that may be reciprocal to one or more operations of the method 600. In a non-limiting example, the gNB 105 may perform an operation that may be the same as, similar to, reciprocal to and/or related to an operation of the method 600, in some embodiments.

In some embodiments, a gNB 105 may perform one or more operations of the method 700, but embodiments are not limited to performance of the method 700 and/or operations of it by the gNB 105. In some embodiments, another device and/or component may perform one or more operations of the method 700. In some embodiments, another device and/or component may perform one or more operations that may be similar to one or more operations of the method 700. In some embodiments, another device and/or component may perform one or more operations that may be reciprocal to one or more operations of the method 700. In a non-limiting example, the UE 102 may perform an operation that may be the same as, similar to, reciprocal to and/or related to an operation of the method 700, in some embodiments. In another non-limiting example, the eNB 104 may perform an operation that may be the same as, similar to, reciprocal to and/or related to an operation of the method 700, in some embodiments.

It should be noted that one or more operations of one of the methods 600, 700 may be the same as, similar to and/or reciprocal to one or more operations of the other method. For instance, an operation of the method 600 may be the same as, similar to and/or reciprocal to an operation of the method 700, in some embodiments. In a non-limiting example, an operation of the method 600 may include reception of an element (such as a frame, block, message and/or other) by the UE 102, and an operation of the method 700 may include transmission of a same element (and/or similar element) by the gNB 105. In some cases, descriptions of operations and techniques described as part of one of the methods 600, 700 may be relevant to the other method.

Discussion of various techniques and concepts regarding one of the methods 600, 700 and/or other method may be applicable to one of the other methods, although the scope of embodiments is not limited in this respect. Such technique and concepts may include public keys, private keys, RRC signaling, DCI, shuffling, transmit operations (such as channel coding, scrambling, mapping of bits to modulated symbols) and/or other.

The methods 600, 700 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 600, 700 and other methods described herein may be practiced by wireless devices configured to operate in other suitable types of wireless communication systems, including systems configured to operate according to various IEEE standards such as IEEE 802.11. The methods 600, 700 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 600, 700 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

In some embodiments, the UE 102 may be arranged to operate in accordance with a new radio (NR) protocol, although the scope of embodiments is not limited in this respect. In some embodiments, the UE 102 may be arranged to operate in accordance with a 3GPP protocol and/or other protocol. In some embodiments, the gNB 105 may be arranged to operate in accordance with an NR protocol, although the scope of embodiments is not limited in this respect. In some embodiments, the gNB 105 may be arranged to operate in accordance with a 3GPP protocol and/or other protocol. In some embodiments, the eNB 104 may be arranged to operate in accordance with a 3GPP protocol, an NR protocol and/or other protocol.

At operation 605, the UE 102 may exchange control signaling with the gNB 105. In some embodiments, the UE 102 may receive, from the gNB 105, a radio resource control (RRC) message that includes a UE capability enquiry element that indicates an enquiry of whether the UE 102 supports shuffling of coded bits. In some embodiments, the UE 102 may transmit, to the gNB, an RRC message that includes a UE capability information element that indicates whether the UE 102 supports the shuffling.

In some embodiments, the UE 102 may receive, from the gNB 105, an RRC message that includes one or more of: an indicator of a physical uplink shared channel (PUSCH) configuration or of a physical uplink control channel (PUCCH) configuration that further indicates whether shuffling is to be enabled or disabled in uplink transmissions from the UE 102; and an indicator of a physical downlink shared channel (PDSCH) configuration or of a physical downlink control channel (PDCCH) configuration that further indicates whether shuffling is to be enabled or disabled in downlink transmissions from the gNB 105.

At operation 610, the UE 102 may randomly select a private key of the UE 102.

At operation 615, the UE 102 may generate a public key of the UE. In some embodiments, the UE 102 may apply a public function to the private key of the UE 102 to determine a public key of the UE 102. The public function may be based on one or more pre-configured numbers that are publicly available. In some embodiments, the public function, numbers used by the public function and/or parameters used by the public function may be one or more of: predetermined, pre-configured, signaled by the UE 102, and signaled by the gNB 105. The scope of embodiments is not limited to usage of the above techniques, however, as any suitable technique to generate the public key of the UE 102 may be used.

In a non-limiting example, the one or more preconfigured numbers may include a base and a modulus. The UE 102 may determine the public key of the UE 102 as a result of a modulo operation, with respect to the modulus, of a term. The term may be equal to the base raised to a power equal to the private key of the UE 102. Variations of this technique may be used, in some embodiments.

In some embodiments, the UE 102 may transmit, to the gNB 105, control signaling that includes the public key of the UE 102. In some embodiments, the control signaling that includes the public key of the UE may be an RRC Reconfiguration Response message and/or other RRC message, although the scope of embodiments is not limited in this respect.

At operation 620, the UE 102 may decode control signaling that indicates a public key of the gNB 105. In some embodiments, the control signaling that includes the public key of the gNB is an RRC Reconfiguration Request message and/or other RRC message, although the scope of embodiments is not limited in this respect.

At operation 625, the UE 102 may generate a shuffling key. In some embodiments, the UE 102 may generate the shuffling key based at least partly on a function (including but not limited to a public function) of the private key of the UE 102 and the public key of the gNB 105, although the scope of embodiments is not limited in this respect. In a non-limiting example, the UE 102 may generate a shuffling key based at least partly on a product that includes the private key of the UE 102 and the public key of the gNB 105. In another non-limiting example, the UE 102 may determine the shuffle key as a result of a modulo operation, with respect to the modulus, applied to a term that is equal to a product of: the base raised to a power equal to the public key of the gNB 105, and the private key of the UE 102. The scope of embodiments is not limited to the above techniques, however, as the UE 102 may use any suitable technique to generate the shuffling key.

At operation 630, the UE 102 may determine a random sequence of bits. In a non-limiting example, the UE 102 may determine the random sequence of bits based on a random number generation operation with the shuffling key as a seed. The scope of embodiments is not limited to the above techniques, however, as the UE 102 may use any suitable technique to determine the random sequence of bits.

At operation 635, the UE 102 may determine a shuffling array. In some embodiments, the UE 102 may determine the shuffling array based at least partly on the random sequence of bits, although the scope of embodiments is not limited in this respect. In some embodiments, a size of the shuffling array may be equal to a size of an element (such as the coded bits, scrambled bits, modulated symbols and/or other) that is to be shuffled. In a non-limiting example, the shuffling array may include a permutation of indexes in a range between one and the size of the coded bits. Embodiments are not limited to the above techniques, however as the shuffling array may be any suitable array/function that can be used to shuffle the element that is to be shuffled.

At operation 640, the UE 102 may perform a channel encoding operation. In some embodiments, the UE 102 may generate coded bits based on information bits.

At operation 645, the UE 102 may perform a shuffling operation. In some embodiments, the UE 102 may shuffle the coded bits. In a non-limiting example, the shuffled, coded bits may be based on a permutation of the coded bits in accordance with the shuffling array. The shuffling array may include a permutation of indexes in a range between one and a size of the coded bits. The coded bits may be permuted according to that permutation. For instance, values of the shuffling array may be [10, 18, 33, 41, . . . ]. Accordingly, coded bit #1 may be mapped to position #10 of a shuffled vector of bits, coded bit #2 may be mapped to position #18 of the shuffled vector of bits, coded bit #3 may be mapped to position #33 of the shuffled vector of bits, coded bit #4 may be mapped to position #41 of the shuffled vector of bits, and so on.

In some embodiments, the UE 102 may perform the shuffling operation on the coded bits. The scope of embodiments is not limited to shuffling of the coded bits, however. In some embodiments, the UE 102 may perform the shuffling operation on an output of a scrambler (like in operation 650), an output of a bit-to-symbol mapping operation (like in operation 655) or another suitable element. Accordingly, it should be noted that embodiments are not limited to the chronological ordering of operations shown in FIG. 6 and operation 645 may occur after operation 650 and/or operation 655, in some embodiments.

At operation 650, the UE 102 may perform a scrambling operation. At operation 655, the UE 102 may perform a mapping between bits and modulated symbols. In some embodiments, the UE 102 may apply the scrambling operation to the shuffled coded bits to generate scrambled bits, although the scope of embodiments is not limited in this respect. In some embodiments, the UE 102 may map scrambled bits to modulated symbols.

In some embodiments, the UE 102 may generate coded bits based on information bits; may generate scrambled bits based at least partly on the coded bits; may generate modulated symbols based at least partly on the scrambled bits; and may apply the shuffling array to one of: the coded bits, the scrambled bits; and the modulated symbols. In some embodiments, the UE 102 may receive, from the gNB 105, control signaling that indicates whether the UE 102 is to apply the shuffling array to the coded bits the scrambled bits or the modulated symbols.

In some embodiments, the UE 102 may generate, for transmission to the gNB 105, one or more packets based on the modulated symbols. In some embodiments, the UE 102 may generate the one or more packets based on the shuffled, coded bits (after the scrambling operation 650 and the mapping operation 655 are performed on the shuffled, coded bits).

One or more of operations 640-655 may be performed, by the UE 102, to generate one or more packets for uplink transmission, with shuffling applied to one or more elements. One or more of operations 660-675 described below may be performed, by the UE 102, to decode packets received from the gNB, with shuffling applied (by the gNB 105) to one or more elements. In some embodiments, the UE 102 may use the same shuffling array to shuffle (operation 645) and to de-shuffle (operation 675), although the scope of embodiments is not limited in this respect.

At operation 660, the UE 102 may perform a demodulation operation. At operation 665, the UE 102 may perform a de-scrambling operation. At operation 670, the UE 102 may perform a de-shuffling operation. At operation 675, the UE 102 may perform a channel decoding operation. In some embodiments, the UE 102 may generate, based on the shuffling array, de-shuffled coded bits based on one or more packets received from the gNB 105. The UE 102 may decode the de-shuffled coded bits.

As described regarding the generation of one or more packets for uplink transmission (operations 640-655), embodiments are not limited to the chronological order shown in FIG. 6. Accordingly, the de-shuffle operation 670 may be performed before operation 660, before operation 665 and/or before operation 675, in some embodiments. In addition, the UE 102 may perform the de-shuffling operation based on which element is shuffled by the gNB 105. For instance, if the gNB 105 shuffles the coded bits, the UE 102 may perform the de-shuffle operation after de-scrambling (operation 665) and before channel decoding (operation 670).

In some embodiments, usage of the shuffling may be for encryption and decryption of packets before an access stratum/non-access stratum (AS/NAS) security is established between the UE 102 and the gNB 105, although the scope of embodiments is not limited in this respect. In some embodiments, the UE 102 may exchange, with the gNB 105, control signaling that includes information for the establishment of the AS/NAS security process. The UE 102 may, after the establishment of the AS/NAS security process: encrypt one or more data packets in accordance with the AS/NAS security process; and refrain from usage of the shuffling for the encryption and decryption of packets exchanged between the UE 102 and the gNB 105.

In some embodiments, the UE 102 may receive, from the gNB 105, downlink control information (DCI) that indicates: whether the shuffling is to be used, and a number of subframes for which the shuffling is to be used. The UE 102 may, for a plurality of subframes of size equal to the number of subframes indicated by the DCI, apply the shuffling as part of encryption and decryption of packets exchanged between the UE 102 and the gNB 105. The UE 102 may, after the plurality of subframes, refrain from usage of the shuffling as part of encryption and decryption of packets exchanged between the UE 102 and the gNB 105.

In some embodiments, the UE 102 may determine a signal quality measurement based on one or more signals received from the gNB 105. The UE 102 may, if the signal quality measurement is less than a threshold: use the shuffling as part of encryption and decryption of packets exchanged between the UE 102 and the gNB 105. The UE 102 may, if the signal quality measurement is greater than or equal to the threshold: refrain from usage of the shuffling as part of encryption and decryption of packets exchanged between the UE 102 and the gNB 105.

In some embodiments, a common shared key may be generated by both the UE 102 and the gNB 105. The common shared key may be used as a shuffling key and/or de-shuffling key by both parties, in some embodiments.

In some embodiments, for downlink and uplink transmission, the UE 102 and the gNB 105 may use a same procedure (and/or similar procedure) to generate two shared secret keys, one for the uplink transmission and one for the downlink transmission.

In some embodiments, an apparatus of a UE 102 may comprise memory. The memory may be configurable to store the shuffling array. The memory may store one or more other elements and the apparatus may use them for performance of one or more operations. The apparatus may include processing circuitry, which may perform one or more operations (including but not limited to operation(s) of the method 600 and/or other methods described herein). The processing circuitry may include a baseband processor. The baseband circuitry and/or the processing circuitry may perform one or more operations described herein, including but not limited to determination of the shuffling array. The apparatus may include a transceiver to transmit and/or receive control signaling. The transceiver may transmit and/or receive other blocks, messages and/or other elements.

At operation 705, the gNB 105 may exchange control signaling with the UE 102. At operation 710, the gNB 105 may randomly select a private key of the gNB 105. At operation 715, the gNB 105 may generate a public key of the gNB 105. At operation 720, the gNB 105 may decode control signaling that indicates a public key of the UE 102. At operation 725, the gNB 105 may generate a shuffling key. At operation 730, the gNB 105 may determine a random sequence of bits. At operation 735, the gNB 105 may determine a shuffling array.

At operation 740, the gNB 105 may perform a channel encoding operation. At operation 745, the gNB 105 may perform a shuffling operation. At operation 750, the gNB 105 may perform a scrambling operation. At operation 755, the gNB 105 may perform a mapping between bits and modulated symbols. Similar to the discussion regarding operations 640-655 for the UE 102, embodiments are not limited to the order shown in FIG. 7. The gNB 105 may perform the shuffling operation on any suitable element (like an output of the scrambling operation 750, an output of the mapping operation 755 and/or other output). Accordingly, operation 745 may be performed after operation 750 and/or after operation 755, in some embodiments.

At operation 760, the gNB 105 may perform a demodulation operation. At operation 765, the gNB 105 may perform a de-scrambling operation. At operation 770, the gNB 105 may perform a de-shuffling operation. At operation 775, the gNB 105 may perform a channel decoding operation. Similar to the discussion regarding operations 760-775 for the UE 102, embodiments are not limited to the order shown in FIG. 7. Accordingly, the de-shuffle operation 770 may be performed before operation 760, before operation 765 and/or before operation 775, in some embodiments. In addition, the gNB 105 may perform the de-shuffling operation based on which element is shuffled by the UE 102. For instance, if the UE 102 shuffles the coded bits, the gNB 105 may perform the de-shuffle operation after de-scrambling (operation 765) and before channel decoding (operation 770).

In some embodiments, the gNB 105 may randomly select a private key for the gNB 105. In some embodiments, the gNB 105 may generate a public key for the gNB 105 based on a public function applied to the private key for the gNB 105. In some embodiments, the gNB 105 may transmit, to the UE 102, control signaling that indicates the public key of the gNB 105. In some embodiments, the gNB 105 may receive control signaling from the UE 102 that includes a public key of the UE 102. In some embodiments, the gNB 105 may generate a shuffling key based on the public function applied to the private key of the gNB 105 and the public key of the UE 102. In some embodiments, the gNB 105 may generate a random sequence of bits based on the shuffling key. In some embodiments, the gNB 105 may generate a shuffling array based on the random sequence of bits. In some embodiments, the gNB 105 may generate coded bits based on information bits. In some embodiments, the gNB 105 may shuffle the coded bits based on the shuffling array. In some embodiments, the gNB 105 may transmit, to the UE 102; one or more packets based on the shuffled, coded bits.

In some embodiments, the gNB 105 may transmit an RRC message that includes a UE capability enquiry element that indicates an enquiry of whether the UE 102 supports shuffling as part of encryption and decryption of packets exchanged between the UE 102 and the gNB 105. In some embodiments, the gNB 105 may receive, from the UE 102, an RRC message that includes a UE capability information element that indicates whether the UE 102 supports the shuffling.

In some embodiments, the gNB 105 may transmit, to the UE 102, an RRC message to include one or more of: an indicator of a physical uplink shared channel (PUSCH) configuration or of a physical uplink control channel (PUCCH) configuration that further indicates whether shuffling is to be enabled or disabled in uplink transmissions from the UE 102; and an indicator of a physical downlink shared channel (PDSCH) configuration or of a physical downlink control channel (PDCCH) configuration that further indicates whether shuffling is to be enabled or disabled in downlink transmissions from the gNB 105.

In some embodiments, the public function may be based on a modulo operation that uses a modulus and a base. In some embodiments, the modulus and the base may be publicly available. In some embodiments, the gNB 105 may determine the public key of the gNB 105 as a result of the modulo operation, with respect to the modulus, applied to a term that is equal to the base raised to a power equal to the private key of the gNB 105. In some embodiments, the gNB 105 may determine the shuffle key as a result of the modulo operation, with respect to the modulus, applied to a term that is equal to a product of: the base raised to a power equal to the public key of the UE 102, and the private key of the gNB 105.

In some embodiments, an apparatus of a gNB 105 may comprise memory. The memory may be configurable to store the shuffling array. The memory may store one or more other elements and the apparatus may use them for performance of one or more operations. The apparatus may include processing circuitry, which may perform one or more operations (including but not limited to operation(s) of the method 700 and/or other methods described herein). The processing circuitry may include a baseband processor. The baseband circuitry and/or the processing circuitry may perform one or more operations described herein, including but not limited to determination of the shuffling array. The apparatus may include a transceiver to transmit and/or receive control signaling. The transceiver may transmit and/or receive other blocks, messages and/or other elements.

Figure 8:
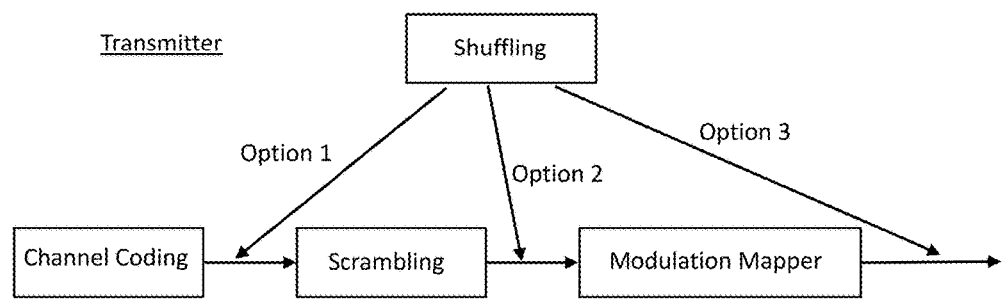
FIG. 8 illustrates example operations that may be performed, in accordance with some embodiments.
Figure 8:
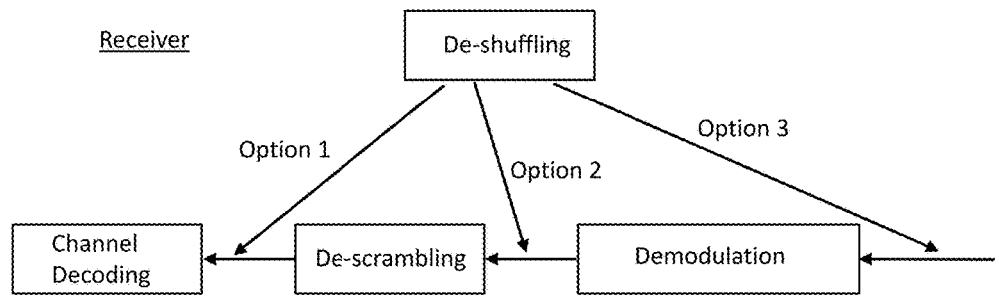
Figure 9:
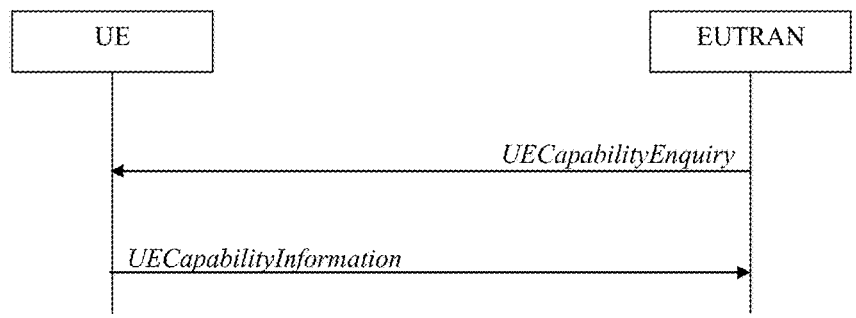
FIG. 9 illustrates example elements that may be exchanged, in accordance with some embodiments.
Figure 10:
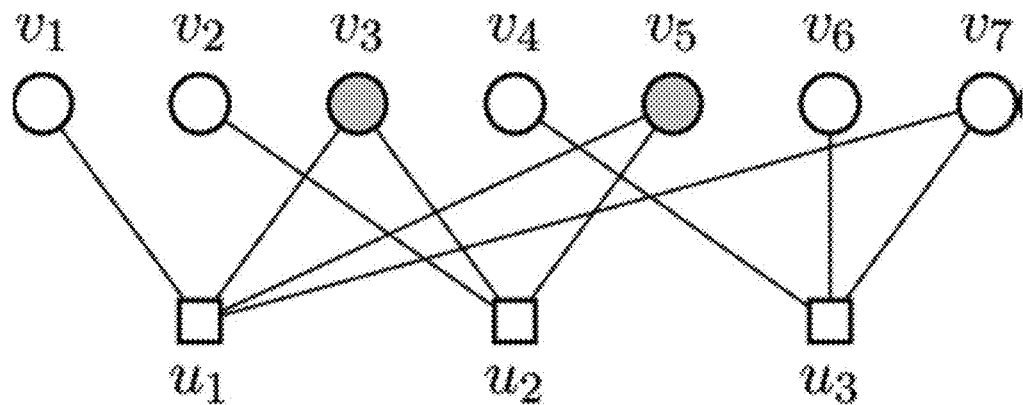
FIG. 10 illustrates an example of a Tanner graph in accordance with some embodiments.

FIG. 8 illustrates example operations that may be performed, in accordance with some embodiments. FIG. 9 illustrates example elements that may be exchanged, in accordance with some embodiments. FIG. 10 illustrates an example of a Tanner graph in accordance with some embodiments. It should be noted that the examples shown in FIGS. 8-10 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 8-10. Although some of the elements shown in the examples of FIGS. 8-10 may be included in a 3GPP LTE standard, 5G standard, NR standard and/or other standard, embodiments are not limited to usage of such elements that are included in standards.

In some cases, including but not limited to some 3GPP based mobile systems, even though there is AS/NAS layers encryption and integrity protection, the communication may be unsecure before the UE 102 passes the NAS AKA and generates the corresponding AS/NAS security keys. Without physical layer security mechanism, the UP transmission may have to be delayed.

In some embodiments, an additional shuffling layer may provide physical layer security protection before AS/NAS security protection is enabled. In some cases, such a solution may be useful for some mission critical use cases. The shuffling layer may apply a shared public key for shuffling transmission bits streams and the public key can be reused many times. The resultant latency and resource overhead may be small but may effectively improve eavesdropped attacks over the wireless communication channel.

In some embodiments, a solution may enable shuffling layer along with LDPC channel coding as an example for security protection in one or more of the following aspects: introduce shuffling layer in transmission chain for shuffling operation with shuffling array; enable shuffling layer in physical layer for providing security protection; design a simple security key exchange protocol (for instance, by using Diffie-Hellman as a way of generating a shared secret between two communication parties and the shared secret is used to generate shuffling array); schedule the radio resource blocks with proper MCS allocation using LDPC with physical layer protection using shuffling array; design control plane signaling procedure to dynamically apply shuffling operation with shuffling array; and/or other.

It should be noted that a "Diffie-Hellman" technique is a way of generating a shared secret between two people in such a way that the secret cannot be seen by observing the communication. Embodiments are not limited to usage of a "Diffie-Hellman" technique, however, as any suitable techniques for public key cryptography may be used in some embodiments. An important distinction is that both parties do not share information during the key exchange, but both parties are creating a key together. This is particularly useful because even if the traffic is recorded and later analyzed, there may not be a way to figure out what the key was, even though the exchanges that created it may have been visible. This is where perfect forward secrecy comes from. Nobody analyzing the traffic at a later date can break in because the key was never saved, never transmitted, and never made visible anywhere. The way it works is reasonably simple. Some of the math is the same as you see in public key crypto in that a trapdoor function is used. And while the discrete logarithm problem is traditionally used (the x^y mod p), the general process can be modified to use elliptic curve cryptography as well.

In some cases, including but not limited to current 3GPP based mobile systems, even though there introduced AS/NAS layers encryption and integrity protection, the communication may be unsecure before the UE 102 passes the NAS AKA and generates the corresponding AS/NAS security keys. Without a physical layer security mechanism, the UP transmission may have to be delayed. In some embodiments, techniques, operations and/or methods described herein may support salient use cases in addition to the AS/NAS security protection.

In some embodiments, PHY security may be improved by introducing a shuffling layer using a shared key with a relatively small penalty in terms of latency and resource overhead. In some embodiments, a shuffle key may be generated for physical layer security protection, and the key exchange may be based on Diffie-Hellman or Elliptic-curve Diffie-Hellman. In some embodiments, the shuffle key may be used to generate a random number stream and may be further used to generate a shuffling array. In some embodiments, the transmitter and the receiver may share the same public key. The transmitter can use the shuffling array to shuffle the channel coding bits for transmission to the peer party (receiver). In the meantime, the receiver can use the shuffle key to de-shuffle the received message before decoding.

In some cases, one or more of the techniques, operations and/or methods described herein may provide a physical layer security mechanism with one or more of the following benefits. 1) Key exchange schemes like Elliptic-curve Diffie-Hellman or Diffie-Hellman are mature and widely used. The exchanged key can be reused for a range of time. 2) One or more of the techniques, operations and/or methods described herein may be used with different types of channel coding, including LDPC, Polar, and/or other, as it is an extra shuffling layer instead of changing the original puncturing or interleaving. 3) Different parts of the message can be shuffled. For example, the systematic part, the appended parity bits and both parts. There may be a tradeoff between speed and security level. 4) The key refreshment may be implemented using a standard method, by counting the time the key has been used, or by counting the number of packets the key has been used. 5) The shuffling array may be generated one time after the key is refreshed, and the shuffling operation may incur a low latency. Thus the penalty of latency may be small. While shuffling array may be generated efficiently, the resource overhead may also be small.

In some embodiments, one or more of the techniques, operations and/or methods described herein may be applicable for two communication parties. The transmitter and receiver may be represented as uplink transmission from the UE 102 to the RAN node 104, downlink transmission from the RAN node 104 to the UE 102, and the device to device communication between two UEs 102.

In some embodiments, shuffling and de-shuffling may be used in the transmission chain. Such embodiments may be referred to herein as "Solution #1" for clarity, but such references are not limiting. This solution introduces a shuffling layer to provide PHY security protection. The shuffling layer can be added at different location of the transmission chain, such as after channel coding or scrambling or modulation blocks. The de-shuffle operation may be added at a corresponding location of the receiver chain. In FIG. 8, non-limiting example block diagrams of a transmitter 800 and a receiver 850 are shown. In addition, three different options for locations in the transmitter chain (and also the receiver chain) in which the shuffling may be performed are labeled as "option 1," "option 2," and "option 3" in FIG. 8.

In the following example, option 1 (shown in FIG. 8) is used as an example to introduce detail operations. Assume Alice and Bob are two communication parties. For example, Alice is the transmitter and Bob is the receiver. One or more of the following operations may be performed. Alice and Bob may exchange security information to generate a security key using Elliptic-curve Diffie-Hellman or Diffie-Hellman. Alice and Bob may use the generated security key as a random number generator to generate a random number stream, denoted as RS. The random number stream RS may be used to generate a shuffling array, denoted as SA, with length of the target bits to shuffle, denoted as $n_{RS}$. Alice may use this SA to shuffle the channel coding bits before sending it to Bob at the transmitter end. Bob may use this SA to shuffle the received message back before decoding.

In some embodiments, the shuffling operation with shuffling array may be applicable to downlink transmission and/or uplink transmission. When shuffling is enabled, the shuffling operation may be performed after the eNB 104/gNB 105 (as a transmitter) encodes the packets for the following one or more subframes transmission for the downlink data transmission. On the other hand, for uplink data transmission, the de-shuffling operation may be performed before the eNB 104/gNB 105 (as a receiver) decodes the packets for the following one or more subframes transmission.

In some embodiments, when the UE 102 receives the RRC message indicating enabling of the shuffling operation with shuffling array from the eNB 104/gNB 105 for the uplink data transmission (UE 102 as a transmitter) or downlink data transmission (UE 102 as a receiver), the UE 102 may perform shuffling/de-shuffling procedure, respectively, using generated shuffling array on shuffling the encoded packets before transmission or using generated de-shuffling array to de-shuffle the packets before decoding the packets.

In some embodiments, one or more techniques, operations and/or methods may be related to UE capability of physical layer security protection using shuffling array. Such embodiments may be referred to herein as "Solution #2" for clarity, but such references are not limiting. If the UE 102 supports shuffling operation with shuffling array for physical layer security protection, the UE may indicate it as Physical layer parameters in UE-EUTRA capability and/or UE-NR capability in a RRC message for conveying UE Capability Information, which may be in response to the RRC message for UE Capability Enquiry sent by the E-UTRAN or NR node. In FIG. 9, a non-limiting example 900 is shown. In some embodiments, if the eNB 104/gNB 105 also supports the shuffling layer for physical layer security protection, the eNB 104/gNB 105 may determine when and/or how to use the shuffling array for the UE 102.

Some embodiments described herein may be referred to as "Solution 3,", "Solution 4," and/or "Solution 5" for clarity but such references are not limiting. In some cases, one or more of Solution 3, Solution 4 and Solution 5 may provide solution(s) to enable and apply the shuffling operation with shuffling array for physical layer security protection.

In some embodiments, a shuffling mechanism (random number generation; internal RNG and shuffling array generation; and/or other) may be used. Such embodiments may be referred to herein as "Solution #3" for clarity, but such references are not limiting. This solution may include a procedure to generate shuffling array on both communication parties without exposing the share security key. One or more of the following operations may be performed. In operation #1, when the shuffling layer is enabled on both ends of the communication party (for instance, a RAN node, eNB 104, gNB 105 and/or other as a transmitter and a UE 102 as a receiver), the RAN node/eNB 104/gNB 105 may initiate a security key exchange procedure using Elliptic-curve Diffie-Hellman or Diffie-Hellman. For example, according to Elliptic-curve Diffie-Hellman or Diffie-Hellman, the RAN node/eNB 104/gNB 105 (Alice) and the UE 102 (Bob) exchange information of the result of the computed value using a random selected number, and then continue to generate security key, K_s. For example, the RAN node/eNB 104/gNB 105 may provide such information in an RRC Reconfiguration Request message as a part of RAN attach procedure or a standalone procedure to invoke RRC Reconfiguration Request procedure.

In operation #2, both communication parties (the RAN node/eNB 104/gNB 105 (Alice) and the UE 102 (Bob)), may further use K_s as a seed to the Random Number Generator (RNG). As both Alice and Bob have the same seed and the same RNG, the generated random number stream, RS, should be the same. In operation #3, with the same RS, both ends can further generated the same shuffling array with length of the target bits to shuffle, denoted as $n_{RS}$, (for instance, 128-bit, 256-bit, 384-bit, and/or other) using Fisher-Yates shuffle algorithm, which is an algorithm with complexity O(n) regarding to the shuffling array length for generating a random permutation of a finite sequence. In operation #4, both communication parties may start to use this SA. The transmitter may shuffle the channel coding bits before sending to the receiver. The receiver (Bob/UE 102) may then use this SA to de-shuffle the received message back before decoding.

In some embodiments, application of the shuffling layer may be related to MCS. Such embodiments may be referred to herein as "Solution #4" for clarity, but such references are not limiting. When the eNB 104/gNB 105 and the UE 102 support capability of shuffling layer for security protection, the eNB 104/gNB 105 may apply shuffling operation with shuffling array according to MCS tables. In some embodiments, the proposed scheme may be based on 3GPP 5G LDPC code, and the shuffling/de-shuffling layer may be added before/after transmitting/receiving. In a non-limiting example, for 3GPP 5G LDPC code, two base matrices (BG1 and BG2) may be used. There may be error floors for BG1 and BG2 with shuffling. In order to avoid error floors for BG1 and BG2, a shuffled version and an original version may be combined to form a complete MCS table.

In a non-limiting example, one or more of the following may be used. When the SNR is in the shuffling range, which is smaller than 23 dB, the transmission system will choose the shuffling version; when the SNR is in the original range, which is greater than 23 dB, the transmission system will choose the original version, because there is error floor for the shuffling scheme; and/or other. In another non-limiting example, the transmission system may use the shuffling version when SNR is smaller than 14 dB, and change to original version when the SNR is greater than 14 dB.

In some embodiments, a control plane signaling design may be used. Such embodiments may be referred to herein as "Solution #5," "Solution 5.1," "Solution 5.2" and/or "Solution 5.3" for clarity, but such references are not limiting. In solution 5.1, an individual indicator at DCI enabling stopping set per subframe may be used. When using shuffling operation with shuffling array for physical layer security protection, the eNB 104/gNB 105 may provide information in DCI (Downlink Control Indicator), which is with an indicator to enable shuffling operation for a specific subframe, sent to the UE 102. The shuffling operation with shuffling array may be applicable in both of downlink and uplink transmission. When shuffling is enabled, the shuffling operation may be performed after the eNB 104/gNB 105 (as a transmitter) encodes the packets for the following one or more subframes transmission for the downlink data transmission. On the other hand, for uplink data transmission, the de-shuffling operation may be performed before the eNB 104/gNB 105 (as a receiver) decodes the packets for the following one or more subframes transmission. When the UE 102 receives the RRC message indicating enabling shuffling operation with shuffling array from the eNB 104/gNB 105 for the uplink data transmission or downlink data transmission, the UE 102 may perform shuffling/de-shuffling procedure, respectively, using generated shuffling array on shuffling the encoded packets before transmission or using generated de-shuffling array to de-shuffle the packets before decoding the packets.

In solution 5.2, enabling/disabling of a shuffling operation in the following one or more subframes by providing an indicator at DCI may be performed. When enabling shuffling operation with shuffling array, the eNB 104/gNB 105 may provide information in DCI, which is with an indicator to enable shuffling operation with shuffling array for the following one or more subframes, sent to the UE 102, wherein the DCI may additionally indicate a number of subframes for using shuffling operation with shuffling array. If the eNB 104/gNB 105 has included the information in DCI with number of subframes for using shuffling operation with shuffling array, the eNB 104/gNB 105 may start a counter for counting number of subframes using shuffling operation with shuffling array. Further, the eNB 104/gNB 105 may disable the shuffling operation with shuffling array by providing information in DCI, which is with an indicator to disable shuffling operation with shuffling array for the following subframes, sent to the UE 102. If the eNB 104/gNB 105 has included the information in DCI with number of subframes for using shuffling operation with shuffling array, the eNB 104/gNB 105 and the UE 102 may disable the shuffling operation with shuffling array when the counter exceeds the indicated number of subframes. In later case, an explicit message may not necessarily need to be provided for disabling the shuffling operation with shuffling array. The shuffling operation with shuffling array may be applicable in downlink and/or uplink transmission. When shuffling is enabled, the shuffling operation may be performed after the eNB 104/gNB 105 (as a transmitter) encodes the packets for the following one or more subframes transmission for the downlink data transmission. On the other hand, for uplink data transmission, the de-shuffling operation may be performed before the eNB 104/gNB 105 (as a receiver) decodes the packets for the following one or more subframes transmission. When the UE 102 receives the RRC message indicating enabling shuffling operation with shuffling array from the eNB 104/gNB 105 for the uplink data transmission or downlink data transmission, the UE 102 may perform shuffling/de-shuffling procedure, respectively, using generated shuffling array on shuffling the encoded packets before transmission or using generated de-suffling array to de-shuffle the pacekts before decoding the packets.

In solution 5.3, enabling/disabling of a shuffling operation with shuffling array using RRC message may be performed. The shuffling operation with shuffling array may be applicable in downlink and/or uplink transmission. The eNB 104/gNB 105 may include an indicator set to enable shuffling operation with shuffling array in an RRC message. For example, for the uplink transmission, the eNB 104/gNB 105 may provide an indicator in the PUCCH/PUSCH configuration. For example, for the downlink transmission, the eNB 104/gNB 105 may provide an indicator in the PDCCH/PDSCH configuration. When shuffling operation with shuffling array is enabled, the eNB 104/gNB 105 may provide the information to physical layer, and perform shuffling operation after encoding (for DL transmission) or perform de-shuffling operation before decoding (for UL transmission) the user plane packets. When the eNB 104/gNB 105 determines to disable the shuffling operation with shuffling array, it may send an RRC Reconfiguration Request message in which the indicator of the shuffling operation with shuffling array is disabled. The shuffling operation with shuffling array may be applicable in the downlink and/or uplink transmission. When shuffling is enabled, the shuffling operation may be performed after the eNB 104/gNB 105 (as a transmitter) encodes the packets for the following one or more subframes transmission for the downlink data transmission. On the other hand, for uplink data transmission, the de-shuffling operation may be performed before the eNB 104/gNB 105 (as a receiver) decodes the packets for the following one or more subframes transmission. When the UE 102 receives the RRC message indicating enabling shuffling operation with shuffling array from the eNB 104/gNB 105 for the uplink data transmission or downlink data transmission, the UE 102 may perform shuffling/de-shuffling procedure, respectively, using generated shuffling array on shuffling the encoded packets before transmission or using generated de-shuffling array to de-shuffle the packets before decoding the packets.

In some embodiments, one or more of the following techniques, operations and/or methods may be performed. These embodiments may be related to Solution 1, although the scope of embodiments is not limited in this respect. In some embodiments, a method for adding a shuffling layer for shuffling operation for a RAN node/eNB 104/gNB 105 may be used. When shuffling is enabled, the shuffling operation may be performed after the RAN node/eNB 104/gNB 105 (as a transmitter) encodes the packets for the following one or more subframes transmission for the downlink data transmission. In some embodiments, when the UE 102 receives the message indicating enabling shuffling operation with shuffling array from the RAN node/eNB 104/gNB 105 for the downlink data transmission, the UE 102 may perform de-shuffling operation using generated de-shuffling array to de-shuffle the packets before decoding the packets. In some embodiments, a shuffling layer for shuffling operation for a UE 102 may be used. When shuffling is enabled, the shuffling operation may be performed after the UE 102 (as a transmitter) encodes the packets for the following one or more subframes transmission for the uplink data transmission. In some embodiments, the RAN node, /eNB 104/gNB 105 (as a receiver) may apply a shuffling operation with shuffling array for the uplink data transmission. It may perform the de-shuffling operation using generated de-shuffling array to de-shuffle the packets before decoding the packets. In some embodiments, for the RAN node/eNB 104/gNB 105, the shuffling layer may be added after channel coding or scrambling or modulation blocks and the de-shuffling layer may be added before channel decoding or de-scrambling or de-modulation blocks.

In some embodiments, one or more of the following techniques, operations and/or methods may be performed. These embodiments may be related to Solution 3, although the scope of embodiments is not limited in this respect. In some embodiments, in a method for a RAN node/eNB 104/gNB 105 as a transmitter and a UE 102 as a receiver, when the shuffling layer is enabled on the both ends of the communication party, the RAN node/eNB 104/gNB 105 may initiate a security key exchange procedure using Elliptic-curve Diffie-Hellman or Diffie-Hellman. In some embodiments, the RAN node/eNB 104/gNB 105 (Alice) and the UE 102 (Bob) may exchange information of the result of the computed value using a random selected number, and then may continue to generate security key, K_s. In some embodiments, the RAN node/eNB 104/gNB 105 may provide information to the UE 102 in an RRC Reconfiguration Request message as a part of RAN attach procedure or a standalone procedure to invoke RRC Reconfiguration Request procedure. In some embodiments, the RAN node/eNB 104/gNB 105 (Alice) and the UE 102 (Bob) may further use K_s as a seed to the Random Number Generator (RNG) and may generate random number stream, RS. In some embodiments, the generated RS at the RAN node/eNB 104/gNB 105 and the UE 102 may be the same, and both ends may further generate the same shuffling array with length of the target bits to shuffle, denoted as $n_{RS}$ (such as 128-bit, 256-bit, 384-bit and/or other), using Fisher-Yates shuffle algorithm. In some embodiments, for the RAN node/eNB 104/gNB 105 and the UE 102, both communication parties may start to use this SA. The transmitter may shuffle the channel coding bits/scrambling bits/modulated bits before sending it to the receiver while the receiver (Bob/UE 102) may use this SA to de-shuffle the received message back before decoding/descrambling/demodulating.

In some cases, channel codes may be used to enhance cryptographic secrecy by hiding information about the cipher-text, thus increasing the difficulty of cryptographic attacks. The code design may rely on puncturing nonsystematic low-density parity check (LDPC) codes with the intent of inflicting an eavesdropper with stopping sets in the decoder. That is, the messages may be transmitted over punctured bits to hide data from eavesdroppers. In some cases, the system may require proper radio resource blocks scheduling and MCS allocation when using LDPC with stopping set. As such, the system can provide a better cryptographic secrecy if the proper radio resource management can increase the relative value of the SNR between the intended receiver and the eavesdroppers. A stopping set is a set Sv in V, which is the set of the variable nodes for a given LDPC code, such that all the check nodes in N(Sv) are connected to Sv by at least two edges, where N(Sv) signifies the neighborhood of Sv and is defined as the set of all adjacent nodes to any member of Sv in the graph Gc. In FIG. 10, a Tanner graph 1000 for a given LDPC with a highlighted stopping set Sv={v3,v5} is shown.

In some embodiments, solutions that enable LDPC channel coding with stopping set for security protection in one or more of the following aspects may be used: enable LDPC channel coding with stopping set by using control plane signaling; schedule the radio resource blocks with proper MCS allocation using LDPC with stopping set; schedule the retransmission radio resource blocks with/without LDPC stopping set to satisfy service requirements for low latency and high reliabilities; and/or other.

In some cases, to achieve secrecy, some previous solutions mainly focus on higher levels instead of physical layer, and these solutions mainly adopt cryptographic algorithms to hide information from eavesdroppers. Previous physical layer mechanisms, such as Physical Unclonable Function (PUF) are used for identification instead. Solutions at physical layer to achieve confidentiality at physical layer may not necessarily be used. In some cases, previous solutions for secrecy are at higher level and may require secret information between Alice and Bob, such as secret key in symmetric ciphers. However, the proposed solution herein at the physical layer does not require any extra secret information between Alice and Bob. In addition, higher-level-only solutions may reveal encrypted information to the attackers, which make the sender (encryption module) and receiver (decryption module) vulnerable to attacks such as side-channel attacks, fault analysis, and/or other. The proposed scheme herein may hide the encryption and decryption modules behind our physical security modules, which make the side-channel attacks and fault analysis more difficult.

In some embodiments, physical layer channel coding may be used. In some cases, a security level of the communication system may be increased as a result, such that the eavesdroppers will not be able to decode the received messages without the same or better channel than the receiver (Bob). Some embodiments may include one or more of the following aspects: enable LDPC channel coding with stopping set by using control plane signaling; schedule the radio resource blocks with proper MCS allocation using LDPC with stopping set; schedule the retransmission radio resource blocks with/without LDPC stopping set to satisfy service requirements for low latency and high reliabilities; and/or other.

In some cases, one or more of the techniques, operations and/or methods described herein may: increase a secrecy level of the communication system without any extra secret information; protect the 5G wireless communication system against side-channel attacks and fault analysis at the same time; and/or other.

Some embodiments may be related to UE capability of LDPC with stopping set for security protection. Such embodiments may be referred to herein as "Solution #1$b$" for clarity, but such references are not limiting. If the UE 102 supports LDPC with stopping set for security protection, the UE 102 may indicate it as Physical layer parameters in UE-EUTRA capability and/or UE-NR capability in a RRC message for conveying UE Capability Information, which may be in respond to the RRC message for UE Capability Enquiry sent by the E-UTRAN or NR node. A non-limiting example 900 is shown in FIG. 9.

In some embodiments, if the eNB 104/gNB 105 also supports the LDPC with stopping set for security protection, the eNB 104/gNB 105 may determine when and/or how to use LDPC with stopping set for the UE. Some embodiments described herein may be referred to as "Solution 2$b$,", "Solution 3$b$," and/or "Solution 4$b$" for clarity but such references are not limiting. In some cases, one or more of Solution 2$b$, Solution 3$b$ and Solution 4$b$ may enable LDPC with stopping set for security.

In some embodiments, Solution 2$b$ may be related to an individual indicator at DCI enabling stopping set per subframe. When using LDPC with stopping set, the eNB 104/gNB 105 provide information in DCI (Downlink Control Indicator), which is with an indicator to enable LDPC with stopping set for a specific subframe, sent to the UE 102. The LDPC with stopping set may be applicable in downlink and/or uplink transmission. When the LDPC with stopping set is enabled, the channel coding encoder/decoder at the eNB 104/gNB 105 encode and/or decode the packets accordingly for the following one or more subframes transmission for the downlink data transmission or uplink data transmission, respectively. When the UE 102 receives the RRC message indicating enabling LDPC with stopping set from the eNB 104/gNB 105 for the uplink data transmission or downlink data transmission, it may encode/decode the packets based on preconfigured algorithms to puncture bits for LDPC with stopping set.

In some embodiments, Solution 3$b$ may be related to enabling and/or disabling LDPC with stopping set in the following one or more subframes by providing an indicator at DCI. When enabling LDPC with stopping set, the eNB 104/gNB 105 may provide information in DCI, which is with an indicator to enable LDPC with stopping set for the following one or more subframes, sent to the UE 102, wherein the DCI may additionally indicate number of subframes for using LDPC with stopping set. If the eNB 104/gNB 105 has included the information in DCI with number of subframes for using LDPC with stopping set, the eNB 104/gNB 105 start a counter for counting number of subframes using the LDPC with stopping set.

In some embodiments, the eNB 104/gNB 105 may disable the LDPC with stopping set by providing information in DCI, which is with an indicator to disable LDPC with stopping set for the following subframes, sent to the UE 102. If the eNB 104/gNB 105 has included the information in DCI with number of subframes for using LDPC with stopping set, the eNB 104/gNB 105 and UE 102 may disable the LDPC with stopping set when the counter exceeds the indicated number of subframes. In later case, an explicit message may not necessarily need to be provided for disabling the LDPC with stopping set.

In some embodiments, the LDPC with stopping set may be applicable in downlink and/or uplink transmission. When the LDPC with stopping set is enabled, the channel coding encoder/decoder at the eNB 104/gNB 105 may encode and/or decode the packets accordingly for the following one or more subframes transmission for the downlink data transmission or uplink data transmission, respectively. When the UE 102 receives the RRC message indicating enabling LDPC with stopping set from the eNB 104/gNB 105 for the uplink data transmission or downlink data transmission, it may encode and/or decode the packets based on preconfigured algorithms to puncture bits for LDPC with stopping set.

In some embodiments, Solution 4$b$ may be related to enabling/disabling LDPC with stopping set using RRC message. The LDPC with stopping set may be applicable in downlink and uplink transmission. The eNB 104/gNB 105 includes an indicator set to enable LDPC with stopping set in an RRC message. For example, for the Uplink transmission, the eNB 104/gNB 105 can provide an indicator in the PUCCH/PUSCH configuration. For example, for the downlink transmission, the eNB 104/gNB 105 can provides indicator in the PDCCH/PDSCH configuration. When LDPC with stopping set is enabled, the eNB 104/gNB 105 may provide the information to physical layer encoder for encoding (for DL transmission) or decoding (for UL transmission) the user plane packets. When the eNB 104/gNB 105 determines to disable the LPDC with stopping set, it may send an RRC Reconfiguration Request message in which the indicator of the LDPC with stopping set to disable. When the LDPC with stopping set is enabled, the channel coding encoder/decoder at the eNB 104/gNB 105 may encode/decode the packets accordingly for the following one or more subframes transmission for the downlink data transmission or uplink data transmission, respectively. When the UE 102 receives the RRC message indicating enabling LDPC with stopping set from the eNB 104/gNB 105 for the uplink data transmission or downlink data transmission, it may encode/decode the packets based on preconfigured algorithms to puncture bits for LDPC with stopping set.

In some embodiments, Solution 5b may be related to the MCS. When the eNB 104/gNB 105 and UE 102 support capability of LDPC with stopping set for security protection, the eNB 104/gNB 105 may apply LDPC with/without stopping set according to the MCS tables. For example, message lengths of 2640 and 800 bits may be used, with one of BPSK/QPSK/16 QAM/64 QAM/256 QAM modulation and LDPC with Stopping Set for coding rate 0.9. The eNB 104/gNB 105 may determine MCS for the radio resource block accordingly. The UE 102 may use a table to encode/decode the LDPC with stopping set based on preconfigured algorithms for uplink data transmission and/or downlink data transmission.

In some embodiments, Solution 6b may be related to hybrid automatic repeat request (HARQ). When the eNB 104/gNB 105 performs HARQ retransmission, the eNB 104/gNB 105 may determine to indicate information in DCI to disable the LDPC with stopping set for the retransmitted subframe, which may be per subframe handling. This may be to provide a reliable transmission and potentially reduce latency caused by puncturing bits using LDPC with stopping set. That is, the enabled LDPC with stopping set is not disabled by the indicator for disabling LDPC with stopping set for the retransmitted subframe. The eNB 104/gNB 105 may continue to use LDPC with stopping set in the following subframes if it is not a retransmitted subframe.

In some embodiments, one or more of the following techniques, operations and/or methods may be performed. These embodiments may be related to Solution 1b, although the scope of embodiments is not limited in this respect. In some embodiments, a UE 102 may support LDPC with stopping set for security protection. The UE 102 may indicate its capability as Physical layer parameters in UE-EUTRA capability and/or UE-NR capability in a RRC message for conveying UE Capability Information, which may be in response to the RRC message for UE Capability Enquiry sent by the E-UTRAN or NR node. In some embodiments, when the eNB 104/gNB 105 receives the UE capability of LDPC with stopping set for security protection, the eNB 104/gNB 105 supporting LDPC with stopping set for security protection may use the information to determine when and how to use LDPC with stopping set for the UE 102.

In some embodiments, one or more of the following techniques, operations and/or methods may be performed. These embodiments may be related to Solution 2b, although the scope of embodiments is not limited in this respect. In some embodiments, the eNB 104/gNB 105 may provide information to the UE 102 in DCI (Downlink Control Indicator) with an indicator to enable LDPC with stopping set for a specific subframe. The LDPC with stopping set may be applicable in downlink and uplink transmission.

In some embodiments, one or more of the following techniques, operations and/or methods may be performed. These embodiments may be related to Solution 3b, although the scope of embodiments is not limited in this respect. In some embodiments, when enabling LDPC with stopping set, the eNB 104/gNB 105 may provide information in DCI, which is with an indicator to enable LDPC with stopping set for the following one or more subframes, sent to the UE 102. The eNB 104/gNB 105 may disable the LDPC with stopping set by providing information in DCI, which is with an indicator to disable LDPC with stopping set for the following subframes, sent to the UE 102. In some embodiments, the DCI may additionally indicate a number of subframes for using LDPC with stopping set. If the eNB 104/gNB 105 has included the information in DCI with number of subframes for using LDPC with stopping set, the eNB 104/gNB 105 may start a counter for counting number of subframes using the LDPC with stopping set. In some embodiments, if the eNB 104/gNB 105 has included the information in DCI with number of subframes for using LDPC with stopping set, the eNB 104/gNB 105 and UE 102 may disable the LDPC with stopping set when the counter exceeds the indicated number of subframes. In later case, no explicit message needs to be provided for disabling the LDPC with stopping set.

In some embodiments, one or more of the following techniques, operations and/or methods may be performed. These embodiments may be related to Solution 4b, although the scope of embodiments is not limited in this respect. In some embodiments, when enabling LDPC with stopping set, the eNB 104/gNB 105 may include an indicator set to enable LDPC with stopping set in an RRC message. If setting for the Uplink transmission, the eNB 104/gNB 105 may provide an indicator in the PUCCH/PUSCH configuration. If setting for the downlink transmission, the eNB 104/gNB 105 may provide indicator in the PDCCH/PDSCH configuration. In some embodiments, when the eNB 104/gNB 105 determines to disable the LPDC with stopping set, it may send an RRC Reconfiguration Request message in which the indicator of the LDPC with stopping set is disabled.

In some embodiments, one or more of the following techniques, operations and/or methods may be performed. These embodiments may be related to Solution 5b, although the scope of embodiments is not limited in this respect. In some embodiments, when the eNB 104/gNB 105 and UE 102 support capability of LDPC with stopping set for security protection, the eNB 104/gNB 105 may apply LDPC with/without stopping set according to the MCS tables. In some embodiments, the UE 102 may use the table to encode/decode the LDPC with stopping set based on preconfigured algorithms for uplink data transmission and/or downlink data transmission.

In some embodiments, one or more of the following techniques, operations and/or methods may be performed. These embodiments may be related to Solution 6b, although the scope of embodiments is not limited in this respect. In some embodiments, when the eNB 104/gNB 105 and UE 102 support capability of LDPC with stopping set for security protection and perform HARQ retransmission, the eNB 104/gNB 105 may determine to indicate information in DCI to disable the LDPC with stopping set for the retransmitted subframe, which may be per subframe handling, which may be to provide a reliable transmission and potentially reduce latency caused by puncturing bits using LDPC with stopping set. In some embodiments, the enabled LDPC with stopping set may not be disabled by the indicator for disabling LDPC with stopping set for the retransmitted subframe. The eNB 104/gNB 105 may continue to use LDPC with stopping set in the following subframes if it is not a retransmitted subframe.

In some embodiments, when the LDPC with stopping set is enabled, the channel coding encoder/decoder at the eNB 104/gNB 105 may encode and/or decode the packets accordingly for the following one or more subframes transmission for the downlink data transmission or uplink data transmission, respectively. In some embodiments, when the UE receives the RRC message indicating enabling LDPC with stopping set from the eNB 104/gNB 105 for the uplink data transmission or downlink data transmission, it may encode and/or decode the packets based on preconfigured algorithms to puncture bits for LDPC with stopping set.

In Example 1, an apparatus of a User Equipment (UE) may comprise memory. The apparatus may further comprise processing circuitry. The processing circuitry may be configured to decode, from a Next Generation Node-B (gNB), a radio resource control (RRC) message that includes a UE capability enquiry element that indicates an enquiry of whether the UE supports shuffling of coded bits. The processing circuitry may be further configured to encode, for transmission to the gNB, an RRC message that includes a UE capability information element that indicates whether the UE supports the shuffling. The processing circuitry may be further configured to randomly select a private key of the UE. The processing circuitry may be further configured to decode, from the gNB, control signaling that includes a public key of the gNB. The processing circuitry may be further configured to generate a shuffling key based at least partly on a public function of the private key of the UE and the public key of the gNB. The processing circuitry may be further configured to determine a random sequence of bits based on a random number generation operation with the shuffling key as a seed. The processing circuitry may be further configured to determine, based on the random sequence of bits, a shuffling array for the shuffling of the coded bits. The processing circuitry may be further configured to store the shuffling array in the memory.

In Example 2, the subject matter of Example 1, wherein a size of the shuffling array may be equal to a size of the coded bits. The shuffling array may include a permutation of indexes in a range between one and the size of the coded bits. The processing circuitry may be further configured to perform a channel coding operation on information bits to generate the coded bits. The processing circuitry may be further configured to shuffle the coded bits, wherein the shuffled, coded bits are based on a permutation of the coded bits in accordance with the shuffling array.

In Example 3, the subject matter of one or any combination of Examples 1-2, wherein the processing circuitry may be further configured to apply a scrambling operation to the shuffled, coded bits to generate scrambled bits. The processing circuitry may be further configured to map the scrambled bits to modulated symbols. The processing circuitry may be further configured to generate the one or more packets based on the modulated symbols for transmission to the gNB.

In Example 4, the subject matter of one or any combination of Examples 1-3, wherein the processing circuitry may be further configured to perform a channel coding operation on information bits to generate the coded bits. The processing circuitry may be further configured to perform a scrambling operation on the coded bits to generate scrambled bits. The processing circuitry may be further configured to shuffle the scrambled bits based on a permutation of the scrambled bits in accordance with the shuffling array. The processing circuitry may be further configured to map the shuffled, scrambled bits to modulated symbols. The processing circuitry may be further configured to generate, based on the modulated symbols, one or more packets for transmission to the gNB.

In Example 5, the subject matter of one or any combination of Examples 1-4, wherein the processing circuitry may be further configured to perform a channel coding operation on information bits to generate the coded bits. The processing circuitry may be further configured to perform a scrambling operation on the coded bits to generate scrambled bits. The processing circuitry may be further configured to map the scrambled bits to modulated symbols. The processing circuitry may be further configured to shuffle the modulated symbols based on a permutation of the scrambled bits in accordance with the shuffling array. The processing circuitry may be further configured to generate, based on the shuffled modulated symbols, one or more packets for transmission to the gNB.

In Example 6, the subject matter of one or any combination of Examples 1-5, wherein usage of the shuffling may be for encryption and decryption of packets before an access stratum/non-access stratum (AS/NAS) security is established between the UE and the gNB.

In Example 7, the subject matter of one or any combination of Examples 1-6, wherein the processing circuitry may be further configured to exchange control signaling with the gNB that includes information for an establishment of the AS/NAS security process. The processing circuitry may be further configured to, after the establishment of the AS/NAS security process: encrypt one or more data packets in accordance with the AS/NAS security process; and refrain from usage of the shuffling for the encryption and decryption of packets exchanged between the UE and the gNB.

In Example 8, the subject matter of one or any combination of Examples 1-7, wherein the processing circuitry may be further configured to decode, from the gNB, downlink control information (DCI) that indicates: whether the shuffling is to be used, and a number of subframes for which the shuffling is to be used. The processing circuitry may be further configured to, for a plurality of subframes of size equal to the number of subframes indicated by the DCI, apply the shuffling as part of encryption and decryption of packets exchanged between the UE and the gNB. The processing circuitry may be further configured to, after the plurality of subframes, refrain from usage of the shuffling as part of encryption and decryption of packets exchanged between the UE and the gNB.

In Example 9, the subject matter of one or any combination of Examples 1-8, wherein the processing circuitry may be further configured to apply the public function to the private key of the UE to determine a public key of the UE. The public function may be based on one or more preconfigured numbers that are publicly available. The processing circuitry may be further configured to encode, for transmission to the gNB, control signaling that includes the public key of the UE.

In Example 10, the subject matter of one or any combination of Examples 1-9, wherein the one or more preconfigured numbers may include a base and a modulus. The processing circuitry may be further configured to determine the public key of the UE as a result of a modulo operation, with respect to the modulus, of a term. The term may be equal to the base raised to a power equal to the private key of the UE.

In Example 11, the subject matter of one or any combination of Examples 1-10, wherein the processing circuitry may be further configured to generate, based on the shuffling array, de-shuffled coded bits based on one or more packets received from the gNB. The processing circuitry may be further configured to decode the de-shuffled coded bits.

In Example 12, the subject matter of one or any combination of Examples 1-11, wherein the control signaling that includes the public key of the gNB may be an RRC Reconfiguration Request message. The control signaling that includes the public key of the UE may be an RRC Reconfiguration Response message.

In Example 13, the subject matter of one or any combination of Examples 1-12, wherein the processing circuitry may be further configured to determine a modulation and coding scheme (MCS) for modulation of symbols, the MCS determined based on a signal quality measurement, the signal quality measurement based on one or more signals received from the gNB. The processing circuitry may be further configured to, if the signal quality measurement is less than a threshold: use the shuffling as part of encryption and decryption of packets exchanged between the UE and the gNB; and if the signal quality measurement is greater than or equal to the threshold, refrain from usage of the shuffling as part of encryption and decryption of packets exchanged between the UE and the gNB.

In Example 14, the subject matter of one or any combination of Examples 1-13, wherein a size of the random sequence of bits may be based on a target size of the coded bits.

In Example 15, the subject matter of one or any combination of Examples 1-14, wherein the shuffling key may be a common shared key between the UE and the gNB for usage in shuffling and de-shuffling. The processing circuitry may be further configured to generate the shuffling key as a shared secret key for uplink transmission. The processing circuitry may be further configured to generate another shuffling key as a shared secret key for downlink transmission.

In Example 16, the subject matter of one or any combination of Examples 1-15, wherein the apparatus may include a transceiver to receive the control signaling that includes the public key of the gNB. The processing circuitry may include a baseband processor to decode the control signaling that includes the public key of the gNB.

In Example 17, a non-transitory computer-readable storage medium may store instructions for execution by processing circuitry of a Next Generation Node-B (gNB). The operations may configure the processing circuitry to, for a security process between the gNB and a User Equipment (UE): randomly select a private key for the gNB; generate a public key for the gNB based on a public function applied to the private key for the gNB; encode, for transmission to the UE, control signaling that indicates the public key of the gNB; decode control signaling from the UE that includes a public key of the UE; generate a shuffling key based on the public function applied to the private key of the gNB and the public key of the UE; generate a random sequence of bits based on the shuffling key; and generate a shuffling array based on the random sequence of bits. The operations may further configure the processing circuitry to generate coded bits based on information bits; shuffle the coded bits based on the shuffling array; and encode, for transmission to the UE; one or more packets based on the shuffled, coded bits.

In Example 18, the subject matter of Example 17, wherein the operations may further configure the processing circuitry to encode, for transmission, a radio resource control (RRC) message that includes a UE capability enquiry element that indicates an enquiry of whether the UE supports shuffling as part of encryption and decryption of packets exchanged between the UE and the gNB. The operations may further configure the processing circuitry to decode, from the UE, an RRC message that includes a UE capability information element that indicates whether the UE supports the shuffling.

In Example 19, the subject matter of one or any combination of Examples 17-18, wherein the operations may further configure the processing circuitry to encode, for transmission to the UE, a radio resource control (RRC) message to include one or more of: an indicator of a physical uplink shared channel (PUSCH) configuration or of a physical uplink control channel (PUCCH) configuration that further indicates whether shuffling is to be enabled or disabled in uplink transmissions from the UE; and an indicator of a physical downlink shared channel (PDSCH) configuration or of a physical downlink control channel (PDCCH) configuration that further indicates whether shuffling is to be enabled or disabled in downlink transmissions from the gNB.

In Example 20, the subject matter of one or any combination of Examples 17-19, wherein the public function may be based on a modulo operation that uses a modulus and a base, wherein the modulus and the base are publicly available. The operations may further configure the processing circuitry to determine the public key of the gNB as a result of the modulo operation, with respect to the modulus, applied to a term that is equal to the base raised to a power equal to the private key of the gNB. The operations may further configure the processing circuitry to determine the shuffle key as a result of the modulo operation, with respect to the modulus, applied to a term that is equal to a product of: the base raised to a power equal to the public key of the UE, and the private key of the gNB.

In Example 21, an apparatus of a User Equipment (UE) may comprise memory. The apparatus may further comprise processing circuitry. The processing circuitry may be configured to randomly select a private key of the UE. The processing circuitry may be further configured to decode, from a Next Generation Node-B (gNB), control signaling that indicates a public key of the gNB. The processing circuitry may be further configured to generate a shuffling key based on the private key of the UE and the public key of the gNB. The processing circuitry may be further configured to generate a random sequence of bits based on a random number generation operation with the shuffling key as a seed. The processing circuitry may be further configured to generate a shuffling array based on the random sequence of bits. The processing circuitry may be further configured to generate coded bits based on information bits. The processing circuitry may be further configured to generate scrambled bits based at least partly on the coded bits. The processing circuitry may be further configured to generate modulated symbols based at least partly on the scrambled bits. The processing circuitry may be further configured to apply the shuffling array to one of: the coded bits, the scrambled bits; and the modulated symbols. The processing circuitry may be further configured to generate, for transmission to the gNB, one or more packets based at least partly on the modulated symbols.

In Example 22, the subject matter of Example 21, wherein the processing circuitry may be further configured to decode, from the gNB, control signaling that indicates whether the UE is to apply the shuffling array to the coded bits the scrambled bits or the modulated symbols.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE), the apparatus comprising: memory; and processing circuitry, configured to:

decode, from a Next Generation Node-B (gNB), a radio resource control (RRC) message that includes a UE capability enquiry element that indicates an enquiry of whether the UE supports shuffling of coded bits;

encode, for transmission to the gNB, an RRC message that includes a UE capability information element that indicates whether the UE supports the shuffling;

randomly select a private key of the UE;

decode, from the gNB, control signaling that includes a public key of the gNB;

generate a shuffling key based at least partly on a public function of the private key of the UE and the public key of the gNB;

determine a random sequence of bits based on a random number generation operation with the shuffling key as a seed;

determine, based on the random sequence of bits, a shuffling array for the shuffling of the coded bits; and store the shuffling array in the memory.

2. The apparatus according to claim 1, wherein:

a size of the shuffling array is equal to a size of the coded bits, the shuffling array includes a permutation of indexes in a range between one and the size of the coded bits, the processing circuitry is further configured to:
 perform a channel coding operation on information bits to generate the coded bits;
 shuffle the coded bits, wherein the shuffled, coded bits are based on a permutation of the coded bits in accordance with the shuffling array.

3. The apparatus according to claim 2, the processing circuitry further configured to:

apply a scrambling operation to the shuffled, coded bits to generate scrambled bits;

map the scrambled bits to modulated symbols; and generate the one or more packets based on the modulated symbols for transmission to the gNB.

4. The apparatus according to claim 1, the processing circuitry further configured to:

perform a channel coding operation on information bits to generate the coded bits;

perform a scrambling operation on the coded bits to generate scrambled bits; and shuffle the scrambled bits based on a permutation of the scrambled bits in accordance with the shuffling array;

map the shuffled, scrambled bits to modulated symbols; and generate, based on the modulated symbols, one or more packets for transmission to the gNB.

5. The apparatus according to claim 1, the processing circuitry further configured to:

perform a channel coding operation on information bits to generate the coded bits;

perform a scrambling operation on the coded bits to generate scrambled bits; and map the scrambled bits to modulated symbols; and shuffle the modulated symbols based on a permutation of the scrambled bits in accordance with the shuffling array; and generate, based on the shuffled modulated symbols, one or more packets for transmission to the gNB.

6. The apparatus according to claim 1, wherein usage of the shuffling is for encryption and decryption of packets before an access stratum/non-access stratum (AS/NAS) security is established between the UE and the gNB.

7. The apparatus according to claim 6, the processing circuitry further configured to:

exchange control signaling with the gNB that includes information for an establishment of the AS/NAS security process;

after the establishment of the AS/NAS security process:
 encrypt one or more data packets in accordance with the AS/NAS security process; and
 refrain from usage of the shuffling for the encryption and decryption of packets exchanged between the UE and the gNB.

8. The apparatus according to claim 1, the processing circuitry further configured to:

decode, from the gNB, downlink control information (DCI) that indicates:
 whether the shuffling is to be used, and
 a number of subframes for which the shuffling is to be used;

for a plurality of subframes of size equal to the number of subframes indicated by the DCI, apply the shuffling as part of encryption and decryption of packets exchanged between the UE and the gNB; and after the plurality of subframes, refrain from usage of the shuffling as part of encryption and decryption of packets exchanged between the UE and the gNB.

9. The apparatus according to claim 1, the processing circuitry further configured to:

apply the public function to the private key of the UE to determine a public key of the UE, wherein the public function is based on one or more pre-configured numbers that are publicly available; and encode, for transmission to the gNB, control signaling that includes the public key of the UE.

10. The apparatus according to claim 9, wherein:

the one or more preconfigured numbers includes a base and a modulus, the processing circuitry is further configured to determine the public key of the UE as a result of a modulo operation, with respect to the modulus, of a term, the term is equal to the base raised to a power equal to the private key of the UE.

11. The apparatus according to claim 9, the processing circuitry further configured to:

generate, based on the shuffling array, de-shuffled coded bits based on one or more packets received from the gNB; and decode the de-shuffled coded bits.

12. The apparatus according to claim 9, wherein:

the control signaling that includes the public key of the gNB is an RRC Reconfiguration Request message, and the control signaling that includes the public key of the UE is an RRC Reconfiguration Response message.

13. The apparatus according to claim 1, the processing circuitry further configured to:

determine a modulation and coding scheme (MCS) for modulation of symbols, the MCS determined based on a signal quality measurement, the signal quality measurement based on one or more signals received from the gNB;

if the signal quality measurement is less than a threshold:
 use the shuffling as part of encryption and decryption of packets exchanged between the UE and the gNB; and if the signal quality measurement is greater than or equal to the threshold:
 refrain from usage of the shuffling as part of encryption and decryption of packets exchanged between the UE and the gNB.

14. The apparatus according to claim 1, wherein a size of the random sequence of bits is based on a target size of the coded bits.

15. The apparatus according to claim 1, wherein:
the shuffling key is a common shared key between the UE and the gNB for usage in shuffling and de-shuffling,
the processing circuitry is further configured to:
generate the shuffling key as a shared secret key for uplink transmission; and
generate another shuffling key as a shared secret key for downlink transmission.

16. The apparatus according to claim 1, wherein:
the apparatus includes a transceiver to receive the control signaling that includes the public key of the gNB,
the processing circuitry includes a baseband processor to decode the control signaling that includes the public key of the gNB.

17. A non-transitory computer-readable storage medium that stores instructions for execution by processing circuitry of a Next Generation Node-B (gNB), the operations to configure the processing circuitry to:
for a security process between the gNB and a User Equipment (UE):
randomly select a private key for the gNB;
generate a public key for the gNB based on a public function applied to the private key for the gNB;
encode, for transmission to the UE, control signaling that indicates the public key of the gNB;
decode control signaling from the UE that includes a public key of the UE; and
generate a shuffling key based on the public function applied to the private key of the gNB and the public key of the UE;
generate a random sequence of bits based on the shuffling key; and
generate a shuffling array based on the random sequence of bits;
generate coded bits based on information bits;
shuffle the coded bits based on the shuffling array;
and encode, for transmission to the UE; one or more packets based on the shuffled, coded bits.

18. The non-transitory computer-readable storage medium according to claim 17, the operations to further configure the processing circuitry to:
encode, for transmission, a radio resource control (RRC) message that includes a UE capability enquiry element that indicates an enquiry of whether the UE supports shuffling as part of encryption and decryption of packets exchanged between the UE and the gNB;
decode, from the UE, an RRC message that includes a UE capability information element that indicates whether the UE supports the shuffling.

19. The non-transitory computer-readable storage medium according to claim 17, the operations to further configure the processing circuitry to:
encode, for transmission to the UE, a radio resource control (RRC) message to include one or more of:
an indicator of a physical uplink shared channel (PUSCH) configuration or of a physical uplink control channel (PUCCH) configuration that further indicates whether shuffling is to be enabled or disabled in uplink transmissions from the UE; and
an indicator of a physical downlink shared channel (PDSCH) configuration or of a physical downlink control channel (PDCCH) configuration that further indicates whether shuffling is to be enabled or disabled in downlink transmissions from the gNB.

20. The non-transitory computer-readable storage medium according to claim 17, wherein:
the public function is based on a modulo operation that uses a modulus and a base, wherein the modulus and the base are publicly available;
the operations further configure the processing circuitry to:
determine the public key of the gNB as a result of the modulo operation, with respect to the modulus, applied to a term that is equal to the base raised to a power equal to the private key of the gNB;
determine the shuffle key as a result of the modulo operation, with respect to the modulus, applied to a term that is equal to a product of:
the base raised to a power equal to the public key of the UE, and
the private key of the gNB.

21. An apparatus of a User Equipment (UE), the apparatus comprising: memory; and processing circuitry, configured to:
randomly select a private key of the UE;
decode, from a Next Generation Node-B (gNB), control signaling that indicates a public key of the gNB;
generate a shuffling key based on the private key of the UE and the public key of the gNB;
generate a random sequence of bits based on a random number generation operation with the shuffling key as a seed;
generate a shuffling array based on the random sequence of bits;
generate coded bits based on information bits;
generate scrambled bits based at least partly on the coded bits;
generate modulated symbols based at least partly on the scrambled bits;
apply the shuffling array to one of: the coded bits, the scrambled bits; and
the modulated symbols; and
generate, for transmission to the gNB, one or more packets based at least partly on the modulated symbols.

22. The apparatus according to claim 21, the processing circuitry further configured to:
decode, from the gNB, control signaling that indicates whether the UE is to apply the shuffling array to the coded bits the scrambled bits or the modulated symbols.

* * * * *